(12) United States Patent
Salvini

(10) Patent No.: US 9,033,402 B2
(45) Date of Patent: May 19, 2015

(54) TRACTOR CABIN ROOF ASSEMBLY

(75) Inventor: Tiziano Salvini, Tribiano (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/574,155

(22) PCT Filed: Jan. 18, 2011

(86) PCT No.: PCT/EP2011/050628
§ 371 (c)(1),
(2), (4) Date: Nov. 9, 2012

(87) PCT Pub. No.: WO2011/089122
PCT Pub. Date: Jul. 28, 2011

(65) Prior Publication Data
US 2013/0119712 A1 May 16, 2013

(30) Foreign Application Priority Data
Jan. 20, 2010 (IT) .............................. TO2010A0036

(51) Int. Cl.
*B62D 33/06* (2006.01)
*B60J 7/16* (2006.01)
*B62D 25/06* (2006.01)
*B62D 29/00* (2006.01)
*B62D 29/04* (2006.01)

(52) U.S. Cl.
CPC *B60J 7/16* (2013.01); *B60J 7/1642* (2013.01); *B62D 25/06* (2013.01); *B62D 29/001* (2013.01); *B62D 33/0617* (2013.01); *B62D 29/043* (2013.01)

(58) Field of Classification Search
USPC ........... 296/187.13, 190.01, 193.03, 210, 214
See application file for complete search history.

(56) References Cited

U.S. PATENT DOCUMENTS 3,891,266 A 6/1975 Wilfert et al.
2004/0212221 A1* 10/2004 Sato ......................... 296/190.08

FOREIGN PATENT DOCUMENTS

| GB | 2400814 A | 10/2004 |
| JP | 2002249073 A * | 9/2002 |
| WO | 2008077187 A1 | 7/2008 |

OTHER PUBLICATIONS

Japanese to English translation of JP 2002-249073, retreived from the JPO Industrial Proiperty Digital Library website on Mar. 12, 2014.*
International Search Report mailed Apr. 14, 2011; PCT/EP2011/050628; 4 pages.

* cited by examiner

*Primary Examiner* — Glenn Dayoan
*Assistant Examiner* — Jason S Daniels
(74) *Attorney, Agent, or Firm* — Sue C. Watson

(57) ABSTRACT

A roof assembly is disclosed for the cabin of a tractor that provides protection against falling objects. The assembly comprises an outer cover of a molded plastics material and a reinforcement metal plate to provide protection against falling objects. The reinforcement plate is secured to the outer cover prior to the assembly being mounted on the cabin frame.

12 Claims, 3 Drawing Sheets

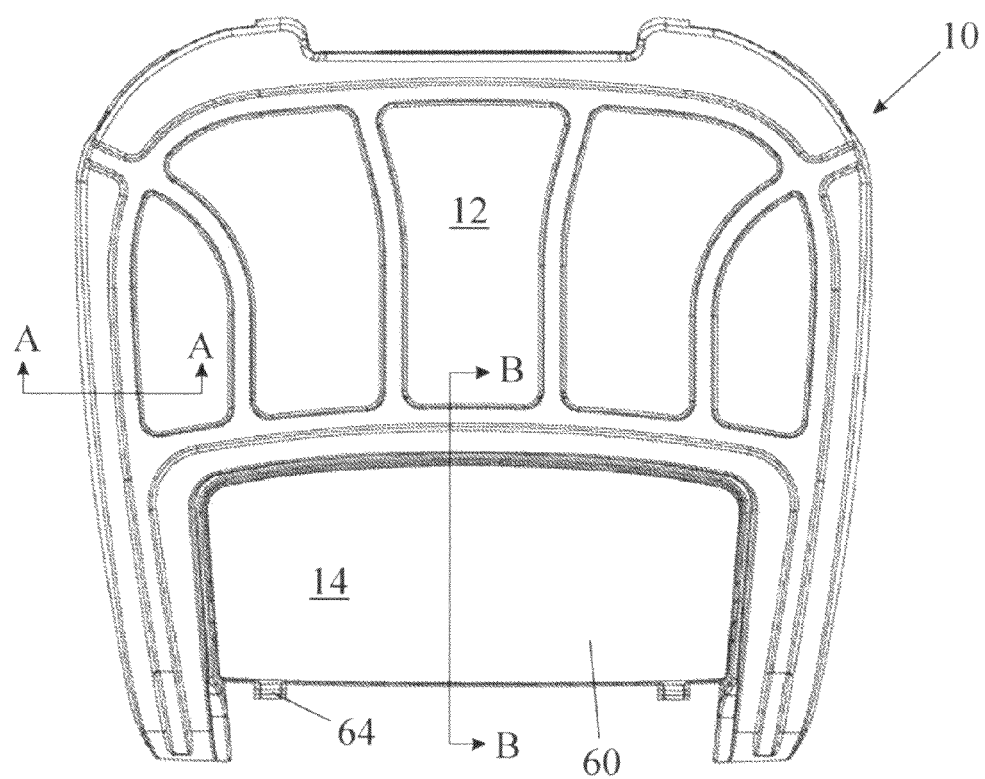
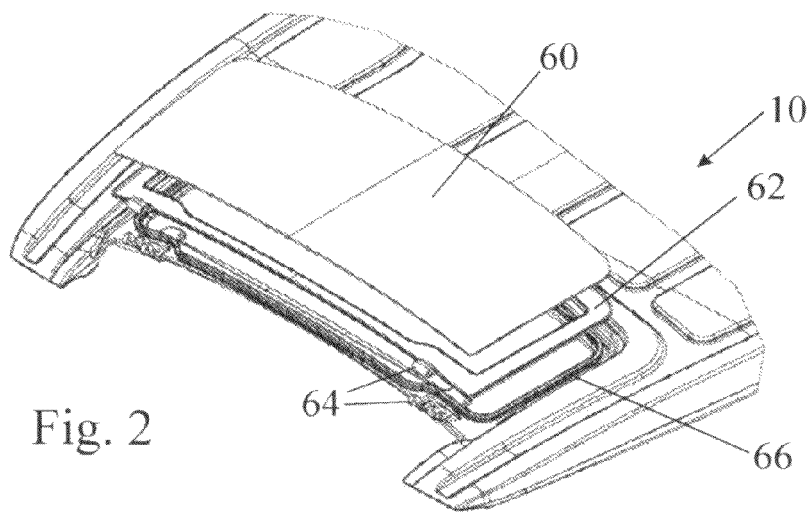

TRACTOR CABIN ROOF ASSEMBLY

CROSS REFERENCE TO RELATED APPLICATIONS

This application is the US National Stage filing of International Application Serial No. PCT/EP/2011/050363 filed on Jan. 12, 2011, which claims priority to Italian Application Serial No. BO2010A000011 filed Jan. 13, 2010, each of which is incorporated herein by reference in its entirety for all purposes.

TECHNICAL FIELD

The present invention relates to a roof assembly for a tractor cabin.

BACKGROUND

In currently available tractors, because of the limited availability of space within the cabin and around the dashboard, some equipment is frequently mounted overhead. Aside from an interior light, one may find speakers, a heater blower or exterior spotlights mounted on the cabin roof. For ease of manufacture, the roof and all the equipment mounted on it are pre-assembled and offered up as a completed roof assembly to the cabin frame. The outer part of the roof is usually made as a plastics moulding and for insulation as well as styling a headliner may be secured to the inside of the outer part as part of the roof assembly.

Existing roofs are designed to be aesthetically pleasing and to provide weather protection but they have not needed to be designed for strength or robustness. This is because the roof assembly is secured to a rigid cabin frame which itself has sufficient structural strength to protect the driver.

However, EEC health and safety regulations require all construction plant to have Falling Object Protective Structures (FOPS). To comply with EEC regulations, a tractor roof must now offer the driver protection against falling objects and current roof assemblies fail to meet this requirement.

The aim of the present invention is to provide a roof structure for the cabin of a tractor that can still benefit from the advantages afforded by pre-assembly yet sufficiently robust to act as a falling object protective structure complying with health and safety regulations.

SUMMARY

According to the present invention, there is provided a roof assembly for the cabin of a tractor, the roof assembly comprising an outer cover of a moulded plastics material and a reinforcement metal plate secured to the outer cover prior to the assembly being mounted on the cabin frame, to provide protection against falling objects.

To meet EEC regulations, one could modify existing roof assemblies by forming the outer cover of sheet metal. Various mounting brackets would then need to be secured to the sheet metal to permit the mounting of ancillary equipment and the exterior of the cover would also need to be prepared and painted. This would make the roof assembly considerably more expensive than one where the outer cover is made as a moulded plastics part.

An alternative possibility would be to secure a metal sheet to the frame of the cabin to form a falling object protective structure and to secure an additional plastics outer cover to the cabin frame to overlie the metal sheet to provide weather protection. When using such an approach, it would not be possible to pre-assemble all the parts of the roof and the roof-mounted ancillary equipment, which would make assembly far more cumbersome and costly.

The present invention, on the other hand, allows the metal reinforcement plate, as well as roof-mounted ancillary equipment and even, if desired, the headliner to be pre-assembled because the reinforcement plate forms part of the roof assembly.

It is preferred for the fixing points by means of which the roof assembly is secured to the cabin frame to be formed exclusively as part of the moulded plastics outer cover. This would mean that the reinforcement plate could be formed as a pressed sheet metal part.

Surprisingly, though only the weaker of the two structural components of the roof assembly is secured to the cabin frame, if the reinforcement plate is secured to the plastics outer cover at many places it will continue to provide the desired protection against falling objects even if the outer plastics cover should be broken by the impact.

Though securing the plastics outer cover to the cabin frame is preferred, it is alternatively possible to provide fixing points on the reinforcement plate in addition to, or instead of, the fixing points on the outer cover.

In the preferred embodiment of the invention, mounting formations are formed on the plastics outer cover to receive ancillary equipment. If necessary, the reinforcement plate may be provided with cut-outs to receive the ancillary equipment secured to the mounting formations.

It is particularly convenient to attach a headliner to the reinforcement plate before mounting of the roof assembly on the cabin frame.

To avoid the headliner obstructing the roof assembly fixings, the outer cover is advantageously dimensioned to overhang the cabin frame and the roof assembly fixings are arranged beneath the overhanging part of the cover. To hide the fixings, bezels may be secured to the underside of the overhanging parts of the outer cover.

BRIEF DESCRIPTION OF THE DRAWINGS

The invention will now be described further, by way of example, with reference to the accompanying drawings, in which:

FIG. 1 is a plan view from above of a roof assembly for a tractor cabin that provides falling object protection complying with EEC regulations, FIG. 2 is a perspective exploded view of the folding sunroof of the roof assembly shown in FIG. 1.

DETAILED DESCRIPTION

Figure 3:
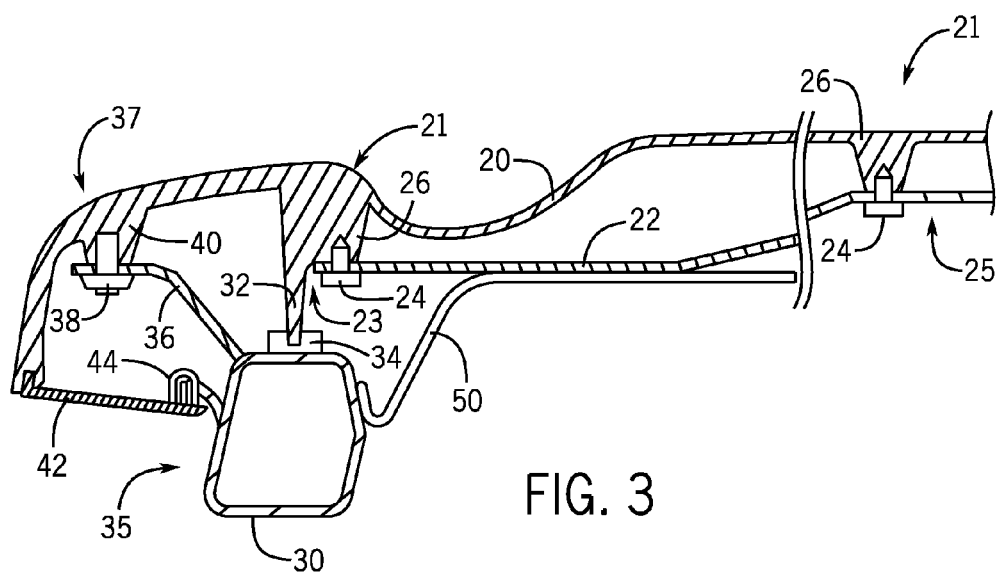
FIG. 3 is a section in the plane A-A in FIG. 1.
Figure 4:
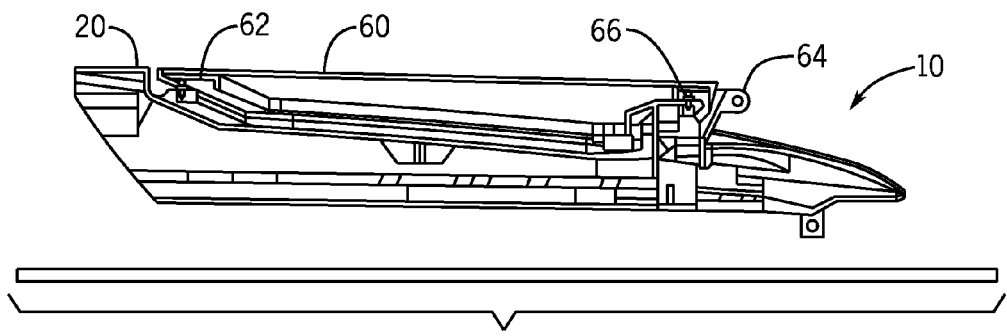
FIG. 4 is a section in the plane B-B in FIG. 1.

The roof assembly 10 shown in the drawings has a main section 12 and a sunroof 14 with a pivotable transparent panel 16. Both the main section 12 and the sunroof 14 are designed to meet EEC FOPS regulations.

To provide protection against falling objects, the main section, as best shown in FIG. 3, comprises an outer cover 20 moulded in a plastics material. A reinforcement plate 22 formed of pressed sheet metal is secured to the outer cover 20. The reinforcement plate 22 can be secured to the outer cover in any suitable manner, for example by an adhesive, but it is important that it should be attached at many locations (e.g., at connections 21), both around its perimeter 23 and its central region 25. In FIG. 3, the method of attachment is represented by screws 24 engaging in posts 26 moulded as part of the outer cover 20.

The outer cover 20 has an downwardly extending rib 32 of which the lower edge is designed to rest on the upper surface of the cabin frame 30. FIG. 3 shows in section a top rail of the cabin frame which serves as an abutment for the cabin door (not shown). A rubber strip 34 is fitted to the rib 30 and sits between the outer cover 20 and the frame 30 both to prevent rattling and to assist in rendering the cabin airtight.

The outer cover 20 is dimensioned to overhang sides 35 of the cabin. Brackets 36 welded to the frame 30 are secured to the outer cover 20 in an overhanging region 37 of the outer cover 20 by means of bolts 38 engaging in further posts 40 moulded as part of the outer cover 20.

After the roof assembly has been bolted in place, bezels 42 are fitted over the underside of the outer cover to hide the bolts 38. A sealing strip 44 is fitted to the bezel 42 both to keep out dirt and render the cabin airtight.

A headliner 50 is also secured as part of the roof assembly before it is mounted on the cabin frame 30. The headliner 50 is centrally secured either to the outer cover 20 or to the reinforcement plate 22 while its outer edge rests on the cabin frame 30.

Figure 5:
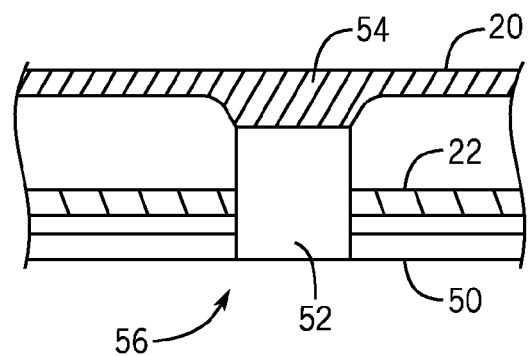
FIG. 5 is a sectional view showing ancillary equipment integrated into the roof assembly.

As shown in FIG. 5, ancillary equipment 52 can be integrated into the roof assembly, and it may be secured to further formations 54 moulded as part of the outer cover 20. Such ancillary equipment 52 may include such items as interior and exterior lights, speakers for the sound system, vents for the venting system, etc. The ancillary equipment 52 may require openings 56 to be formed in the reinforcement plate 22 and/or the headliner 50.

The advantage of the roof assembly as described above is that it may be pre-assembled before being fitted to the cabin roof 30. After the reinforcement plate 22, the headliner 50 and any ancillary equipment have been assembled with one another, the entire assembly is placed over the cabin roof and bolted onto the brackets 36. As all the bolts 38 are in the overhanging part of the outer cover 20, the reinforcement plate 22 and the headliner 50 to not impede access to the mounting points. After the bolts 38 have been tightened. The bezels 42 and their seals 44 can be simply pushed into place to conceal the mountings, and prevent dirt from entering into the roof assembly.

In the illustrated embodiment, the reinforcement plate 22 is not directly bolted to the cabin frame 30. Despite this, because of its multiple connections 21 to the outer cover 20 and because it overlaps the cabin roof, it provides full protection against falling objects. As an alternative, the reinforcement plate may be directly secured to cabin frame 30 in addition to or instead of the outer cover, while still permitting the roof to be pre-assembled prior to its being fitted to the cabin frame.

In a conventional tractor roof fitted with a sunroof, the transparent roof panel is made of glass. Such a panel is not capable of offering sufficient protection against falling objects.

To overcome this problem, the transparent panel 60 in the illustrated embodiment of the invention is formed of a plastics material. The preferred plastics material is a polycarbonate but any transparent or translucent plastics material having sufficient strength to withstand the impact of a falling object may alternatively be used.

Despite its ability to withstand impact, a plastics panel is not as rigid as glass and is therefore capable of flexing. Such flexing would prevent it from sealing against the roof frame, resulting in unacceptable leaks.

To avoid this problem, as best shown by the exploded view in FIG. 2, the plastics panel 60 of the illustrated embodiment of the invention is secured to a rigid frame 62 which is in turn connected by a hinge 64 to the remainder of the roof assembly 10. The frame 62 is engages a sealing strip 66 that is secured to the roof assembly and surrounds the sunroof opening.

The frame 62 may be formed of pressed sheet metal but it is preferred for it to be made of a fibre reinforced resin, such as fibreglass or carbon fibre. This reduces both the bulk and the weight of the frame, rendering it less conspicuous and obtrusive while increasing the impact resistance of the plastics panel and adding to its structural rigidity.

The invention claimed is:

1. A roof assembly for a cabin of a tractor, comprising:
an outer cover formed from a moulded plastic material; and
a reinforcement metal plate secured to the outer cover at a plurality of connections around a perimeter of the reinforcement metal plate and at a center region of the reinforcement metal plate, wherein the roof assembly is configured to be secured to a frame of the cabin via at least one post formed as part of the outer cover, the outer cover is dimensioned to have an overhanging portion that extends laterally outward from the frame of the cabin and overhangs the frame of the cabin while the roof assembly is secured to the frame of the cabin, and the at least one post is positioned beneath the overhanging portion of the outer cover.

2. The roof assembly of claim 1, wherein mounting formations are formed on the outer cover to receive ancillary equipment secured to the mounting formations.

3. The roof assembly of claim 2, wherein the reinforcement metal plate comprises openings configured to receive the ancillary equipment secured to the mounting formations of the outer cover.

4. The roof assembly of claim 1, wherein a headliner is attached to the reinforcement metal plate or to the outer cover.

5. The roof assembly of claim 1, comprising bezels secured to an underside of the overhanging portion of the outer cover to hide the at least one post, to hide threaded members coupled to the at least one post, or a combination thereof.

6. A roof assembly for a cabin of a tractor, comprising:
an outer cover having a plurality of posts molded as part of the outer cover; and
a reinforcement plate coupled to the outer cover via a first post of the plurality of posts, wherein the roof assembly is configured to be coupled to a frame of the cabin of the tractor via a second post of the plurality of posts, the outer cover comprises an overhanging portion configured to extend laterally outward from the frame of the cabin and to overhang the frame of the cabin, and the second post is positioned in the overhanging portion.

7. The roof assembly of claim 6, wherein the second post is configured to be coupled to a bracket extending from the frame of the cabin via a threaded member.

8. The roof assembly of claim 6, wherein the reinforcement plate is not directly coupled to the frame of the cabin.

9. The roof assembly of claim 6, wherein the reinforcement plate is secured to the outer cover at a perimeter of the reinforcement plate and at a center region of the reinforcement plate via connections comprising the first post and additional posts of the plurality of posts.

10. The roof assembly of claim 6, wherein the reinforcement plate comprises openings configured to receive ancillary equipment secured to mounting formations of the outer cover.

11. A roof assembly for a cabin of a tractor, comprising:
an outer cover formed from a plastic material and having one or more mounting formations configured to support ancillary equipment; and
a reinforcement plate coupled to the outer cover and comprising one or more openings configured to receive the ancillary equipment supported by the one or more mounting formations of the outer cover, wherein the roof assembly is configured to be mounted to a frame of the cabin via threaded members coupled to respective posts molded as part of the outer cover, the outer cover comprises an overhanging portion configured to extend laterally outward from the frame of the cabin and to overhang the frame of the cabin, and the respective posts are positioned in the overhanging portion.

12. The roof assembly of claim 11, wherein the reinforcement plate is secured to the outer cover via a plurality of connections around a perimeter of the reinforcement plate and at a center region of the reinforcement plate.

\* \* \* \* \*